United States Patent
Elkins

(10) Patent No.: US 10,570,588 B1
(45) Date of Patent: Feb. 25, 2020

(54) SYSTEMS AND METHODS FOR PERFORMING GRADING OPERATIONS BASED ON DATA CAPTURED FROM SITE MARKERS DISTRIBUTED ACROSS A WORKSITE

(71) Applicant: CNH Industrial America LLC, New Holland, PA (US)

(72) Inventor: Scott Andrew Elkins, Plainfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/229,169

(22) Filed: Dec. 21, 2018

(51) Int. Cl.
  *E02F 9/26* (2006.01)
  *G06K 19/07* (2006.01)
  *E02F 3/76* (2006.01)

(52) U.S. Cl.
  CPC .............. *E02F 9/262* (2013.01); *E02F 9/265* (2013.01); *G06K 19/0723* (2013.01); *E02F 3/76* (2013.01)

(58) Field of Classification Search
  CPC combination set(s) only.
  See application file for complete search history.

(56) References Cited

U.S. PATENT DOCUMENTS

| | | | |
|---|---|---|---|
| 5,631,658 A * | 5/1997 | Gudat | A01B 79/005 342/357.31 |
| 5,825,298 A | 10/1998 | Walter | |
| 6,227,761 B1 * | 5/2001 | Kieranen | E01C 19/006 404/118 |
| 6,880,643 B1 * | 4/2005 | Zimmerman | E02F 3/84 172/4.5 |
| 8,800,859 B2 | 8/2014 | Amor et al. | |
| 9,101,112 B2 | 8/2015 | Giunta | |
| 9,447,550 B2 | 9/2016 | Hill et al. | |
| 2004/0158355 A1 * | 8/2004 | Holmqvist | G05D 1/0236 700/245 |
| 2008/0133128 A1 * | 6/2008 | Koch | E02F 3/435 37/348 |

FOREIGN PATENT DOCUMENTS

| | | |
|---|---|---|
| CN | 103103998 | 5/2013 |
| FR | 2995398 | 3/2014 |
| JP | 2005061994 | 3/2005 |
| JP | 2006216007 | 8/2006 |
| JP | 2006317268 | 11/2006 |

* cited by examiner

*Primary Examiner* — Travis R Hunnings
(74) *Attorney, Agent, or Firm* — Peter K. Zacharias; Patrick M. Sheldrake

(57) ABSTRACT

A system for performing a grading operation relative to a worksite may include a plurality of site markers positioned at a different site marker locations spaced apart along the worksite. Each site marker may be associated with grading information related to one or more grading parameters to be applied at or adjacent to its respective site marker location within the worksite during the performance of the grading operation. The system may also include a grading vehicle having a marker sensor configured to capture data providing an indication of the grading information from each site marker. In addition, the system may include a controller communicatively coupled to the sensor. The controller may be configured to identify the grading information based on the data received from the marker sensor and control the operation of a component of the grading vehicle during the performance of the grading operation based on the grading parameter(s).

20 Claims, 3 Drawing Sheets

SYSTEMS AND METHODS FOR PERFORMING GRADING OPERATIONS BASED ON DATA CAPTURED FROM SITE MARKERS DISTRIBUTED ACROSS A WORKSITE

FIELD OF THE INVENTION

The present subject matter relates generally to grading systems and related methods for performing grading operations and, more particularly, to a system and method for grading a worksite based on data automatically captured from site markers, such as stakes, distributed across the worksite.

BACKGROUND OF THE INVENTION

Grading vehicles, such as bulldozers or other crawler-tractors, are typically equipped with a blade for scraping the ground or pushing material along the ground. The blade is pivotally connected to the chassis of the grading vehicle such that it can pivot up and down. Additionally, blade controls are often provided to the operator in the cab of the vehicle for raising and lowering the blade with respect to the chassis of the vehicle. One of the most common uses for blades on grading vehicles is to level or otherwise grade the ground for construction of houses, buildings, parking lots, and roads.

Prior to the performance of a grading operation, a survey of the worksite is typically completed. As part of the surveying process, the worksite is often staked based on a previously generated topography map to indicate the different grades to be made across the worksite. The stakes are typically wooden stakes with handwritten markings to indicate to the operator of the grading vehicle what action(s) is required at such stake location when performing the subsequent grading operation. As a result, the operator must be able to see and translate the handwritten markings provided on each stake to ensure that the desired grade pattern is followed. Unfortunately, the operator is typically unable to view the stake markings when operating the grading vehicle. As a result, the operator must often stop the grading operation and exit the vehicle to view the markings provided on one or more adjacent stakes. This results in increased time and effort for completing the grading operation.

Accordingly, systems and methods for performing a grading operation based on data automatically captured from site markers, such as stakes, distributed across the worksite would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for performing a grading operation relative to a worksite. The system may generally include a plurality of site markers positioned at a plurality of different site marker locations spaced apart along the worksite. Each site marker may be associated with grading information related to one or more grading parameters to be applied at or adjacent to its respective site marker location within the worksite during the performance of the grading operation. The system may also include a grading vehicle having a marker sensor configured to capture data providing an indication of the grading information from each site marker. In addition, the system may include a controller communicatively coupled to the marker sensor. The controller may be configured to identify the grading information based on the data received from the marker sensor and control the operation of a component of the grading vehicle during the performance of the grading operation based on the one or more grading parameters associated with the grading information.

In another aspect, the present subject matter is directed to a method for performing a grading operation relative to a worksite. The method may include receiving, with a computing device, data captured from a plurality of site markers positioned at a plurality of different site marker locations spaced apart along the worksite. Additionally, based on the data associated with each site marker, the method may include identifying, with the computing device, one or more grading parameters to be applied at or adjacent to the respective site marker location of the site marker during the performance of the grading operation. Moreover, the method may include adjusting, with the computing device, an operation of a component of the grading vehicle based on the one or more grading parameters as the grading vehicle is moved across the worksite at or adjacent to the respective site marker location of each site marker within the worksite.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
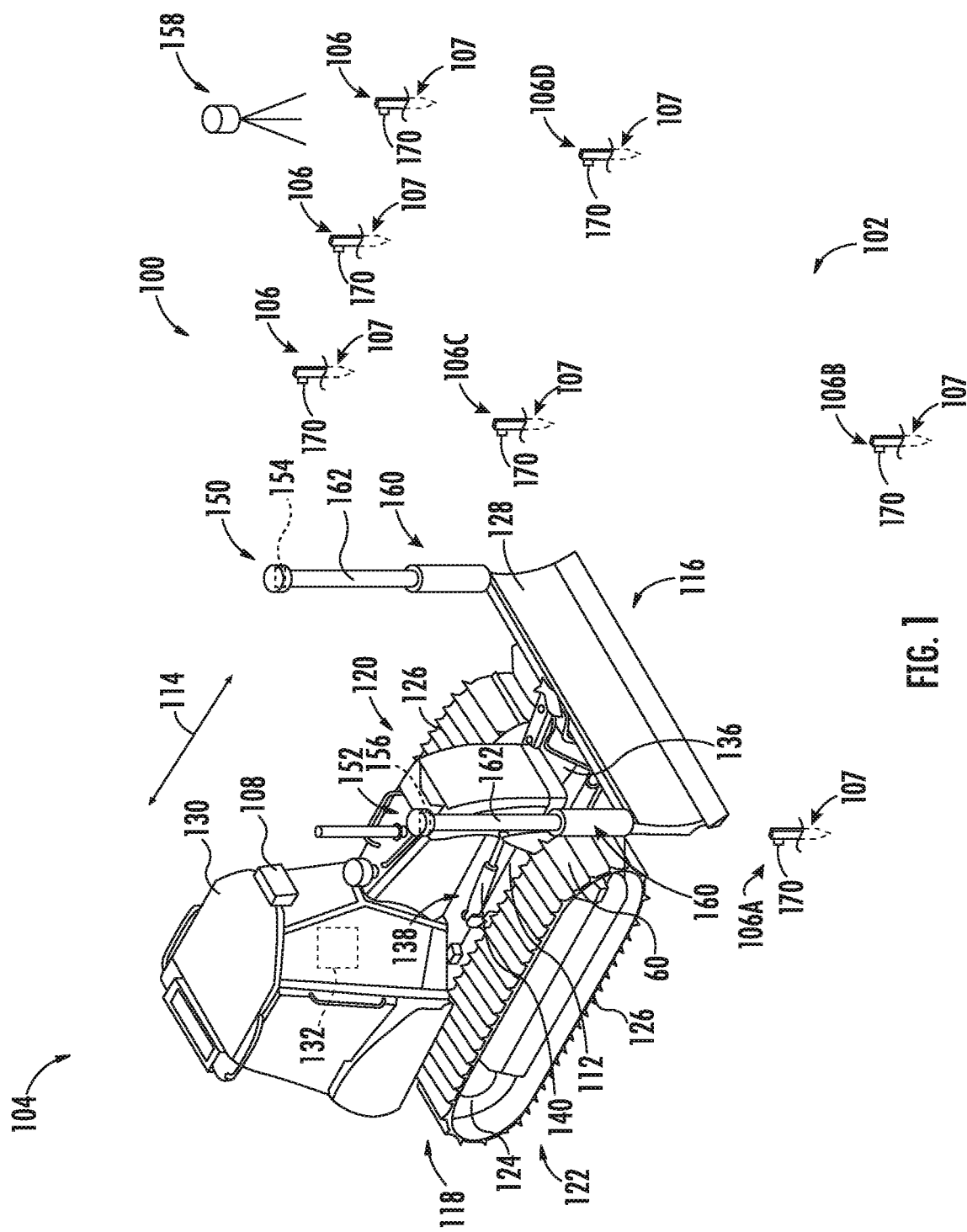
FIG. 1 illustrates a perspective view of one embodiment of a system for performing a grading operation relative to a worksite in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for performing grading operations relative to a worksite using a grading vehicle, such as bulldozer. Specifically, in several embodiments, the system may include a plurality of site markers (e.g., stakes) configured to be distributed across the worksite, with each site marker being associated with grading information including or indicative of one or more grading parameters to be applied when performing a grading operation at or adjacent to the location of the site marker. Additionally, the grading vehicle may include one or more marker sensor(s) configured to automatically capture data from each site marker that is directly or indirectly related to the grading information assigned to or associated with the site marker. The data captured by the marker sensor(s) may then be used by a vehicle controller of the grading vehicle to identify one or more of the grading parameters to be applied at or adjacent to the location of each site marker. The controller may then automatically control the operation of one or more components of the grading vehicle based on the identified grading parameter(s). For instance, when new grading information is obtained from a newly encountered site marker, the controller may be configured to update associated data presented to the operator via a display device of the vehicle. In addition to updating the data displayed to the operator (or as an alternative thereto), the controller may be configured to automatically control the operation of one or more components of the vehicle's hydraulic system to adjust the position of the vehicle's grading implement when new grading information is obtained from a newly encountered site to ensure that the desired surface grade is achieved across the worksite.

It should also be appreciated that, for purposes of discussion, the various directional references provided herein will generally be described relative to a Cartesian coordinate system, in which the z-axis generally extends in a vertical direction (i.e., a direction parallel to the direction of gravity at a given location) and the x- and y-axes generally extend in a horizontal plane that is perpendicular to the vertical direction. For example, the directional references may correspond to a local East, North, Up (ENU) Cartesian coordinate system in which the coordinates are defined relative to a plane tangent to the earth's surface fixed to a specific location such that the x-axis extends east/west, the y-axis extends north/south, and the z-axis extends up/down.

Referring now to the drawings, FIG. 1 illustrates a perspective view of one embodiment of a system 100 for performing a grading operation relative to a worksite 102 in accordance with aspects of the present subject matter. As shown, the system 100 includes a grading vehicle 104 configured to perform a grading operating relative to the worksite 102 and a plurality of site markers 106 (e.g., stakes or similar ground-engaging members) spaced apart from one another along the worksite 102. As will be described in greater detail below, the grading vehicle 104 may include one or more marker sensors 108 configured to receive or capture data associated with each site marker 106 that directly or indirectly relates to grading information for performing the grading operation at or adjacent to the location of the site marker 106. For instance, in one embodiment, the marker sensor(s) 108 may be configured to receive or detect data from each site marker 106 that is indicative of various types of grading parameters relevant to the performance of the grading operation at or adjacent to such marker 106. The data may then be transmitted to a controller 110 (FIG. 2) of the grading vehicle 104 to allow the operation of one or more components of the vehicle 104 to be automatically controlled as the grading operation is being performed.

As shown in FIG. 1, the grading vehicle 104 is configured as a bulldozer or "dozer." However, in other embodiments, the grading vehicle 104 may be configured as any other suitable vehicle known in the art that is configured to perform grading operations, such as other suitable types of crawler-tractors. In general, the grading vehicle 104 may include a chassis 112 extending longitudinally (e.g., as indicated by arrow 114 in FIG. 1) between a forward end 116 of the vehicle 104 and an aft end 118 of the vehicle 104. The chassis 112 may generally be configured to support various components of the grading vehicle 10. For example, an engine (not shown) of the vehicle 104 may be fixed to the chassis 112 for driving first and second drive systems 120, 122 of the vehicle 104, with each drive system 120, 122 including a drive wheel 124 rotationally coupled to the engine and an endless track 126 driven by the drive wheel 124. In addition, the chassis 112 may be configured to support a grading implement, such as a blade 128, at the forward end 116 of the vehicle 104 and an enclosed operator's cab 130 at the aft end 118 of the vehicle 104. A human-machine interface (HMI) or user interface 132 may be located within the cab 130 and may include various input devices for receiving operator inputs and/or output devices for providing information to the operator. For instance, as will be described below with reference to FIG. 2, the user interface 132 may include a display device 134 (FIG. 2) for presenting grading information to the operator of the grading vehicle as a grading operation is being performed relative to the worksite 102.

In several embodiments, the blade 128 may be configured to be pivotally coupled to the chassis 112 to allow the relative position of the blade 128 to be adjusted when performing a grading operation. For example, as shown in FIG. 1, in one embodiment, the blade 128 may be coupled to the chassis 112 via a pair of pivot arms 136. In such an embodiment, the grading vehicle 104 may also include a hydraulic system 138 including one or more hydraulic components for adjusting the position of the blade 128. For example, the vehicle 104 may include one or more actuators, such as one or more hydraulic lift cylinders 140, coupled between the pivot arms 136 and the chassis 112 to allow the position of the blade 128 to be adjusted relative to both the chassis 112 and the ground. For example, retraction/actuation of the lift cylinder(s) 140 may result in the pivot arms 136 pivoting relative to the chassis 112, thereby raising and lowering the blade 128 relative to the ground. In addition, the vehicle 104 may also include one or more actuators, such as one or more hydraulic tilt cylinders 142 (FIG. 2) configured to adjust the tilt angle or orientation of the blade 128 relative to the pivot arms 136. For example, the tilt cylinder(s) 142 may be coupled between the pivot arms 136 and the blade 128 to allow the blade 128 to be pivoted about a pivot point defined relative to the pivot arms 136.

Additionally, in several embodiments, one or more automatic grading sensor assemblies 150, 152 may also be installed on the grading vehicle 104. For example, as shown in the illustrated embodiment, the grading vehicle 104 includes first and second sensor assemblies 150, 152 coupled to the blade 128 so as to be supported above the blade 128 at a location aligned with the opposed sides of the blade 128. Each sensor assembly 150, 152 may, for example, include one or more grading sensors (e.g., one or more first grading sensors 154 of the first sensor assembly 510 and one or more second grading sensors 156 of the second sensor assembly 152). In several embodiments, the grading sensors 154, 156 may be configured to detect a light beam emitted from a laser-based grading device 158 positioned at the worksite (e.g., a 2-D laser-based device including a rotating laser configured to emit one or more light beams along a horizontal reference plane defined relative to the worksite 102). In such embodiments, the light beam emitted from the grading device 158 may serve to provide a height reference for the grading operation. Specifically, by detecting the light beam via the grading sensors 154, 156, the vehicle controller 110 (FIG. 2) may automatically determine the height of the grading sensors 154, 156 (and, thus, the height of the blade 128) relative to the reference plane across which the light beam is being emitted. As a result, the relative height of the blade 128 may be continuously determined and tracked as the grading vehicle 10 is moved across the worksite 102. As will be described below, such relative height information, along with the grading information determined from the site markers 106, may allow for the vehicle controller 110 to actively control the operation of the components of the hydraulic system 138 in a manner that positions the blade 128 at the proper height and/or orientation relative to the ground for achieving the desired surface grade at each location across the worksite 102.

It should be appreciated that, as an alternative to using the grading sensors 154, 156 to determine a height reference for the grading operation, the grading vehicle 104 may include any other suitable sensor(s) and/or sensing device(s) that capture and/or provide data directly or indirectly indicative of the current height or position of the blade 28 relative to the ground. For instance, the grading vehicle 104 may include an on-board sensing device (e.g., a camera, LIDAR device, proximity sensor) that allows the vehicle controller 110 to monitor the current depth of the surface that the vehicle 104 is traveling on by detecting the ground and/or a marker on the ground (e.g., one of the site markers 106). Such information may then be used to establish a height reference for controlling adjusting the position of the blade 128. In another embodiment, the grading vehicle 104 may include a positioning device (e.g., a GNSS device) to establish a height reference for controlling/adjusting the position of the blade 128.

As shown in FIG. 1, each sensor assembly 150, 152 may be vertically supported relative to the grading vehicle 104 via a mast 160. In several embodiments, each mast 160 may be configured as a powered mast and, thus, may include suitable components for adjusting the vertical positioning of its respective sensor assembly 150, 152 relative to the blade 128, thereby allowing for a height of each sensor assembly 150, 152 above the blade 128 to be varied. For instance, in one embodiment, each mast 160 may include a mast pole or arm 162 to which the respective sensor assembly 150, 152 is mounted. In such an embodiment, the mast arm 162 may, for example, be configured to be vertically actuated (e.g., via a worm gear arrangement or via hydraulic or pneumatic actuation) to allow the height of the sensor assembly 150, 152 relative to the blade 128 to be adjusted.

It should be appreciated that the configuration of the grading vehicle 104 described above and shown in FIG. 1 is provided only to place the present subject matter in an exemplary field of use. Thus, it should be apparent that the present subject matter may be readily adaptable to any manner of grading vehicle configuration.

As indicated above, the disclosed system 100 may also include a plurality of site markers 106 spaced apart from one another across the worksite 102 at a plurality of different marker site locations 107. In several embodiments, the site markers 106 may be configured as stakes that are push into or otherwise installed relative to the ground at the various different site locations 107 across the worksite 102. However, in other embodiments, the site markers 106 may correspond to any other suitable marker or stake-type members or devices distributed across the worksite 102, including any suitable ground-engaging members that are positioned on top of and/or penetrate into the ground at their respective site locations 107.

In general, the specific locations 107 for the site markers 106 within the worksite 102 and the spacing defined between markers 106, along with the total number of markers 106 being used across the worksite 102, may generally vary depending on the grading operation being performed at the worksite 102 and the associated grading or topography map to be followed when performing the grading operator. In several embodiments, the site markers 106 may be distributed across the worksite 102 in a manner similar to how conventional survey/grading stakes are distributed across a worksite, such as by spacing or grouping the markers 106 across the worksite 102 based on the specific grading parameter(s) prescribed by the corresponding grading map at or adjacent to the location of the marker(s) 106. For instance, markers 106 may be spaced apart a given distance(s) from one another along a given reference line or path when the markers 105 are being used to identify a centerline and/or a shoulder of a surface grade. Similarly, the spacing and/or relative positioning of the markers 106 may be dependent on the change in surface grade (e.g., the slop ratio) between adjacent markers 106, such as when the markers 106 are being used to identify the locations of slopes or offsets in the surface grade.

Additionally, in several embodiments, each site marker 106 may be provided in operative association with a data transmission device 170 configured to store grading information associated with one or more grading parameters relevant to performing the desired grading operating at or adjacent to the specific site location 107 of such marker 106. For instance, the data transmission device 170 associated with a given site marker 106 may be configured to store grading information prescribed by the grading map defined for the worksite 102, which may include, but is not limited to, the marker type associated with the site marker 106 (e.g., a right-of-way marker, offset marker, slope marker, shoulder marker, centerline marker, finish line marker, etc.), the location of the marker 106 within the worksite 102, the direction to grade (e.g., on grade, cut, fill, slope, etc.), the distance to grade, the slope ratio, the distance from the centerline of the grade surface, and/or the like. As such, it should be appreciated that the grading information stored by each data transmission device 170 may correspond to location-specific data that varies depending on the location of the associated site marker 106 relative to the grading map defining the desired surface grade to be achieved across the worksite 102.

Moreover, in embodiments of the disclosed system 100 that utilize data transmission devices 170, each data transmission device 170 may also be configured to wirelessly transmit its stored grading information to the marker sensor(s) 108 of the grading vehicle 104. In such embodiments, the specific the data transmission devices 170 and associated marker sensor(s) 108 selected for use within the disclosed system 100 may generally correspond to any suitable components that allow for the transmission of data wirelessly between such components. For instance, in one embodiment, each data transmission device 170 may correspond to an RFID tag (e.g., a passive or active RFID tag) coupled to or otherwise installed relative to its respective site marker 106. In such an embodiment, the marker sensor(s) 108 may correspond to a suitable RFID reader that is configured to receive the grading information stored within each RFID tag via radio waves transmitted to the reader from the RFID tag. In another embodiment, each data transmission device 170 may correspond to any other suitable device coupled to or otherwise installed relative to its respective site marker 106 that is configured for wireless communications, such as any suitable wireless electronic device configured to transmit data via Bluetooth or any other suitable wireless communications protocol. In such an embodiment, the marker sensor(s) 108 may correspond to or include any suitable receiver configured to wirelessly receive data from the data transmission device 170.

It should be appreciated that, in addition to using data transmission devices 170 (or as an alternative thereto), each site marker 106 may be configured to include or be associated with a visual indicator that can be detected or read by the marker sensor(s) 108 to determine the grading information associated with such site marker 106. For instance, in several embodiments, the grading information associated with a given site marker 106 may be encoded into a barcode (e.g., a linear-type or matrix-type bar code) or other machine-readable visual code (e.g., a digital stamp) that is applied to or otherwise positioned on the site marker 106. In such embodiments, the marker sensor(s) 108 may, for example, correspond to a vision-based sensor (e.g., a camera, optical scanner, and/or the like) configured to read or detect the barcode or other machine-readable code provided in association with each site marker 106. As another example, the visual indicator associated with each site marker 106 may simply correspond to a unique color or alphanumeric code (or a unique combination of a color and alphanumeric code) that can be visually detected by the marker sensor(s) 108. For instance, the marker sensor(s) 108 may correspond to a camera configured to capture an image of each encountered site marker 106 as the grading vehicle 104 is moved across the worksite 102 during the performance of a grading operation. Each image captured of a site marker 106 may then be analyzed to identify the specific site marker 106 from a list or database of the various site markers 106 distributed across the worksite 102 based on the detected color and/or alphanumeric code associated with the imaged site marker 106. In such an embodiment, the grading information associated with each site marker 106 may, for example, be stored at an accessible location, such as within the memory of the vehicle controller 110. Thus, by identifying the specific site marker 106 detected by the marker sensor(s) 108, the controller 110 may determine the corresponding grading information that has been assigned to or associated with such site marker 106.

It should be appreciated that, depending on the specific technology being used to determine the grading information associated with each site marker 106, the marker sensor(s) 108 may, in certain, instances be capable of detecting two or more site markers 106 simultaneously. For example, when using data transmission devices 170 to wirelessly transmit grading information from the site markers 106 to the marker sensor(s) 108, the sensor(s) 108 may be capable of receiving data from the data transmission devices 170 of multiple site markers 106 positioned relative to the proximal location of the grading vehicle 104 depending on the broadcast range of the data transmission devices 170 and/or the relative spacing between the site markers 106. In such an embodiment, the vehicle controller 110 may be configured to determine the site marker(s) 106 from which data is required to continue the performance of the grading operation based on, for example, the current location of the grading vehicle 104 within the worksite 102, the current heading of the grading vehicle 104, the location of each of the detected site markers 106, the relative location and/or distance between the grading vehicle 104 and each of the detected site markers 106, and/or any other suitable factors. For instance, in the embodiment shown in FIG. 1, the marker sensor(s) 108 may, from its current location, be capable of reading the grading information stored on the data transmission devices 170 associated with a plurality of nearby site markers 106 (e.g., a first site marker 106A, a second site marker 106B, a third site marker 106C, and a fourth site marker 106D). In such an embodiment, based on the current position/heading of the grading vehicle 104 and the data received from the data transmission devices 170 of the detected site markers 106A, 106B, 106C, 106D, the controller 110 may determine that it only needs to utilize the grading information from the first and second site markers 106A, 106B while grading vehicle 104 makes its current pass across the worksite 102. In addition, the controller 110 may determine that, since the first site marker 106A is positioned closest to the grading vehicle 104 and, thus, will be encountered before the second site marker 106B, the grading information from the first site marker 106B should be used when performing the grading operation until the grading vehicle 104 reaches and/or passes the first site marker 106A (or until the grading vehicle 104 is within a given distance from the second site marker 106B), at which point the controller 110 may utilize the grading information from the second site marker 106B to continue the performance of the grading operation.

Additionally, it should be appreciated that the marker sensor(s) 108 may generally be installed on or within the grading vehicle 104 at any suitable location that allows the sensor(s) 108 to function as described herein. For instance, as shown in FIG. 1, the marker sensor(s) 108 is mounted to the top of the vehicle's cab 130. However, in other embodiments, the marker sensor(s) 108 may be installed relative to and/or supported by any other suitable component(s) of the grading vehicle 104. For instance, in alternative embodiment, the marker sensor(s) 108 may be positioned at the top of the blade 128.

Figure 2:
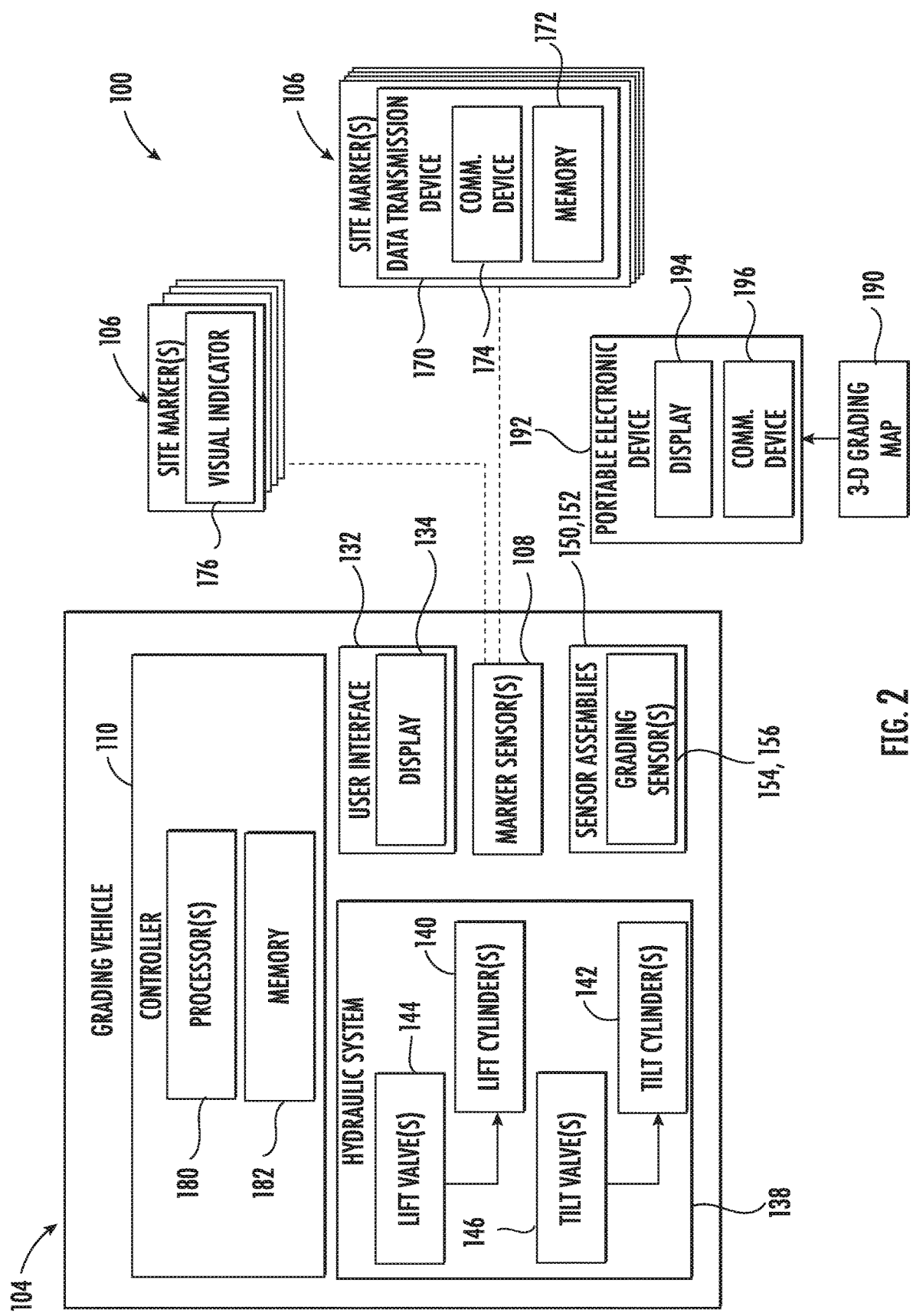
FIG. 2 illustrates schematic view of a specific implementation of a system for performing a grading operation relative to a worksite in accordance with aspects of the present subject matter.

Referring now to FIG. 2, a schematic view of a specific implementation of the disclosed system 100 is illustrated in accordance with aspects of the present subject matter. In general, the system 100 will be described with reference to the various system components described above with reference to FIG. 1. However, in other embodiments, the system 100 may be implemented with any other suitable system components, including any other suitable type of grading vehicle, site markers and/or sensor technology configured to function in a manner consistent with the description provided herein.

As shown in FIG. 2, the system 100 may generally include the grading vehicle 104 and the site markers 106 described above with reference to FIG. 1. Thus, the grading vehicle 104 may include, for example, one or more marker sensors 108, a vehicle controller 110, and a user interface 132. As indicated above, the marker sensor(s) 108 may be configured to detect or acquire data from each site marker 106 that is associated with the grading information to be used when performing a grading operation at or adjacent to the location of such site marker 106. Additionally, in one embodiment, the grading vehicle 104 may include one or more sensor assemblies 150, 152, with each sensor assembly 150, 152 including one or more grading sensors 154, 156 configured to detect one or more characteristics of a light beam emitted from a corresponding laser-based grading device 158 (FIG.

1). Moreover, as shown in FIG. 2, the system 100 may also include various components of the vehicle's hydraulic system 138, such as one or more lift cylinders 140 for raising and lowering the blade 128 relative to the chassis 112 and one or more tilt cylinders 142 for pivoting the blade 128 relative to the pivot arms 136. In such an embodiment, the hydraulic system 138 may also include one or more control valves for regulating the flow of hydraulic fluid to each cylinder 140, 142, such as one or more lift control valves 144 for controlling the flow of hydraulic fluid to the lift cylinders 140 and one or more tilt control valves 146 for controlling the flow of hydraulic fluid to the tilt cylinders 142.

As indicated above, the vehicle controller 110 may be configured to electronically control the operation of one or more components of the grading vehicle 104, such as the operation of one or more of the hydraulic components of the vehicle's hydraulic system 138 and/or the operation of one or more components of the vehicle's user interface 132 (e.g., a display device 134 of the interface 132). In several embodiments, the controller 110 may be coupled to suitable components for controlling the operation of the various cylinders 140, 142 of the grading vehicle 104. For example, as shown in FIG. 2, the controller 110 may be communicatively coupled to the control valves 144, 146 configured to control the supply of hydraulic fluid to each cylinder 140, 142. In such an embodiment, hydraulic fluid may be supplied to the control valves 144, 146 from a fluid tank (not shown) mounted on and/or within the grading vehicle 104 (e.g., via a pump (not shown)). The controller 110 may then be configured to control the operation of each valve 144, 146 in order to control the flow of hydraulic fluid supplied to each of the cylinders 140, 142. For instance, the controller 110 may be configured to transmit suitable control commands to the lift control valves 144 in order to regulate the flow of hydraulic fluid supplied to the cap and rod ends of each lift cylinder 140, thereby allowing the controller 110 to adjust the vertical positioning or height of the blade 128 as the pivot arms 136 are pivoted relative to the vehicle's chassis 112. Similarly, the controller 110 may be configured to transmit suitable control commands to the tilt control valves 146 in order to regulate the flow of hydraulic fluid supplied to the cap and rod ends of each tilt cylinder 142, thereby allowing the controller 110 to adjust the orientation of the blade 128 relative to the pivot arms 136.

It should be appreciated that the controller 110 may generally comprise any suitable processor-based device known in the art, such as a computing device or any suitable combination of computing devices. Thus, in several embodiments, the controller 110 may include one or more processor(s) 180 and associated memory device(s) 182 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 182 of the controller 110 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 182 may generally be configured to store suitable computer-readable instructions that, when implemented by the processor(s) 180, configure the controller 110 to perform various computer-implemented functions, such as by performing one or more of the aspects of the method 200 described below with reference to FIG. 3. In addition, the controller 110 may also include various other suitable components, such as a communications circuit or module, one or more input/output channels, a data/control bus and/or the like.

It should also be appreciated that the controller 110 may correspond to an existing controller of the grading vehicle 104 or the controller 110 may correspond to a separate processing device. For instance, in one embodiment, the controller 110 may form all or part of a separate plug-in module that may be installed within the grading vehicle 104 to allow for the disclosed system and method to be implemented without requiring additional software to be uploaded onto existing control devices of the vehicle 104.

Additionally, as shown in FIG. 2, the configuration of the site markers 106 may depend, for example, on the specific technique or methodology being used to identify the grading information associated with each site marker 106 and its respective site marker location 107 (FIG. 1) within the worksite 102. For example, as indicated above, in several embodiments, each site marker 106 may be provided in operative association with a data transmission device 170 that is configured to both store data relating to the grading information assigned to such marker 106 and transmit such data for receipt by the marker sensor(s) 108. In such embodiments, the data transmission device 170 associated with each site marker 106 may, for instance, include a suitable memory 172 for storing the relevant grading data (e.g., a computer-readable medium or integrated circuit) and a wireless communications device 174 (e.g., an antenna or transceiver) for wireless transmitting the data to the marker sensor(s) 106. For instance, in one embodiment, the memory 172 and communications device 174 may form part of an RFID tag, in which case the marker sensor(s) 108 may correspond to a suitable device (e.g. an RFID reader) configured to read or receive the data from the RFID tag. In another embodiment, the memory 172 and communications device 174 may form part of any other suitable device capable of wireless communications, such as a Bluetooth-enabled device and/or any other suitable electronic device configured to wirelessly communicate with the marker sensor(s) 108 via any suitable wireless communications protocol.

Alternatively, as indicated above, the site markers 106 may, in several embodiments, be provided with a visual indicator 176 that can be detected by the marker sensor(s) 108. For instance, in one embodiment, the visual indicator 176 may correspond to a barcode or other suitable machine-readable visual code positioned or applied on the site marker 106 that is capable of being detected by the marker sensor(s) 108. In another embodiment, the visual indicator 176 may correspond to a specific color or alphanumeric code associated with each site marker 106. Regardless, in such embodiments, the marker sensor(s) 108 may, for example, correspond to a vision-based sensor(s) (e.g., a camera, optical scanner, and/or the like) to allow for detection of the relevant visual indicator 176.

It should be appreciated that, for purposes of description, the embodiment of the system 100 illustrated in FIG. 2 is shown as including both site markers 106 equipped with data transmission devices 170 and site markers 106 having visual indicators 176 associated therewith. However, the system 100 need not include both types of site markers 106. For instance, in one implementation, the system 100 may only include site markers 106 equipped with data transmission devices 170 or site markers having visual indicators 176.

Referring still to FIG. 2, in several embodiments, prior to the performance of a grading operation relative to a worksite 102, a three-dimensional grading map 190 may be initially developed that defines or prescribes the desired surface grade at each location across the worksite 102. For instance, the grading map 190 may include a desired surface grade (e.g., a z-coordinate) for each set of local or global x and y coordinates within the worksite 102. Additionally, in accordance with aspects of the present subject matter, the grading map 190 may also identify the various locations at which the site markers 106 are to be placed across the worksite 102. For example, the grading map 109 may define a plurality of site marker locations 107 (FIG. 1) based on the location(s) of surface grade features across the worksite 102 (e.g., centerlines, shoulders, finish lines, right-of-way lines, etc.) and/or based on relative changes of the surface grade across the worksite 102 (e.g., the locations of sloped surfaces). In such an embodiment, each site marker location 107 may be specified by a specific set of local and/or global x and y coordinates within the worksite 102. Moreover, in several embodiments, the grading map 190 may also specify the grading parameters or information to be assigned to or otherwise associated with each site marker 106 at its respective location 107, such as the marker type associated with the site marker 106 (e.g., right-of-way, offset, slope, shoulder, centerline, finish, etc.), the direction to grade (e.g., on grade, cut, fill, slope, etc.), the distance to grade, the slope ratio, the distance from the centerline of the grade, and/or the like.

It should be appreciated that the grading map 190 may be initially created and/or stored on any suitable computing device(s), including a computing device(s) separate from the various system components described herein. For instance, a site developer or surveyor may initially create and store the grading map 190 on a given computing device and subsequently transmit the grading map 190 and its associated map data to one or more components of the disclosed system 100. For instance, in several embodiments, the system 100 may include a portable electronic device 192 (e.g., a handheld electronic device) configured to receive and store the grading map 190. In such embodiments, the portable electronic device 192 may, for example, be used to place the site markers 106 across the worksite 102 based on the predefined site marker locations 107 associated with the grading map 190. For instance, the portable electronic device 192 may correspond to a location-aware device configured to track its location relative to the worksite 102. In such an embodiment, the location of the portable electronic device 192 within grading map 190 may be similarly determined to allow a surveyor or other worker to place the site markers 106 at each specified site marker location 107 within the grading map 190. For instance, the portable electronic device 192 may include a display device 194 that is used to display the grading map 190 and the current location of the device 192 within the map 190 to a survey worker to allow the worker to identify site marker locations 107 as he/she traverses across the worksite 102.

Additionally, in embodiments in which the site markers 106 are provided in operative association with data transmission devices 170, the portable electronic device 192 may include a communications device 196 (e.g., an antenna, a transceiver, or any other suitable communications device) configured to transmit the grading information to be stored on a given data transmission device 170 when placing the associated site marker 106 relative to the worksite 102. For example, a worker may reference the grading map 190 displayed on the portable electronic device 192 to identify a site marker location 107 and subsequently position a site marker 106 at such location. Upon positioning the site marker 106 at the desired location, the portable electronic device 192 may be used to transmit the grading information associated with such location (e.g., via the communications device 196) to the corresponding data transmission device 170 of the site marker 106. The worker may repeat this process when placing each site marker 106 within the worksite 102 such that the data transmission device 170 of each site marker 106 includes the relevant grading information from the grading map 190 associated with its specific location within the worksite 102.

It should be appreciated that, in addition to using the portable electronic device 192 to individually transmit the grading information to each site marker 106 as it is placed within the worksite 102 (or as an alternative thereto), the individual grading information may be broadcast across to the various site markers 106 simultaneously from a single device (e.g., a device located on the grading machine 104 or a device located at a centralized location relative to the worksite 102). For instance, each data transmission device 170 may include or be associated with a unique identification (ID) number. In such an embodiment, the respective grading information may be broadcast across the worksite 102 to each site marker 106 based on its ID number. Such broadcasting of the grading information may be particularly advantageous to allow modifications in the desired surface grade to be quickly and efficiently implemented across the worksite 102 without requiring an individual reconfiguration of each of the site markers 106. For instance, in the event that the grading map 190 is changed after the site markers 106 have been positioned within the field, the new grading information may be broadcast across the worksite 102, thereby allowing the previously stored grading information on each data transmission device 170 to be updated to account for the changes to the grading map 190.

Moreover, in embodiments in which the site markers 106 are provided in association with a visual indicator 176, the portable electronic device 192 may be used to identify which visual indicator 176 should be placed at each site marker location and/or to assign each visual indicator 176 to a particular site marker location. For example, when the grading information for the various marker site locations has been encoded into barcodes or other machine-readable electronic codes, a worker may utilize the map data stored on the portable electronic device 192 to identify which particular code should be used for the marker site location at which he/she is currently located. For instance, when the worker reaches a given marker site location, a barcode number or other identifying information may be displayed to the worker to allow the worker to select the appropriate code for such location. The worker may then retrieve the appropriate barcode (e.g., a sticker including the barcode) and attach it to the site marker 106 being placed at that specific marker site location. Alternatively, in embodiments in which the visual indicators 176 correspond to specific colors and/or alphanumeric codes associated with the site markers 106, the worker may input the color and/or code of the site marker 106 being placed at a given site marker location. The portable electronic device 192 may then correlate the site marker location with the specific identifying information of the site marker 106 placed at such location. For instance, if the site marker 106 placed at a given site marker location has a specific alphanumeric code printed or applied onto the marker 106 (e.g., "C47"), the worker may input such code into the portable electronic device 192, which may then correlate the code with the grading information from the grading map 190 that is associated with the specific site marker location. The correlations for each site marker 106 may be stored within the portable electronic device 192 and subsequently transmitted to the vehicle controller 110. As such, when the marker sensor(s) 108 detects the visual indicator 176 associated with a given site marker 106 (e.g., "C47") during the performance of a subsequent grading information, the vehicle controller 110 may look-up or access the grading information associated with such indicator to allow the operation of the grading vehicle 104 to be controlled based on such information.

As indicated above, the vehicle controller 110 may generally be configured to control the operation of one or more components of the grading vehicle 104 as the vehicle 104 is being used to perform a grading operation relative to a worksite 102. In accordance with aspects of the present subject matter, such control of the grading vehicle 104 by the controller 110 may be based, at least in part, on the grading information associated with the site markers 106 as the vehicle 104 encounters each site marker 106 within the worksite 102 during the performance of the grading operation. Specifically, as the grading vehicle 104 is moved across the worksite 102, the marker sensor(s) 108 may receive or detect data from each encountered site marker 106 that is associated (directly or indirectly) with the grading parameters to be applied at the location of such site marker 106. Based on the data received from the marker sensor(s) 108, the controller 110 may then control an appropriate component(s) of the grading vehicle 104.

For instance, when the grading vehicle 104 is being operated within a manual mode (e.g., when the operator is providing manual inputs to control the components of the hydraulic system 138 in a manner that adjusts the position of the blade 128), the controller 110 may be configured to transmit suitable control signals to the user interface 132 to cause the appropriate grading information to be presented to the operator. Specifically, in one embodiment, the controller 110 may be configured to cause a suitable graphical user interface to be presented to the operator via the display device 134 that includes the grading parameters that should be applied as the grading vehicle 104 moves across the worksite 102. For example, as the grading vehicle 104 encounters a site marker 106 within the worksite 102, the marker sensor(s) 108 may acquire the appropriate data from the site marker 106 associated with the grading parameters to be applied at or adjacent to the location of such site marker 106. The grading parameters and/or other information related thereto may then be displayed to the operator to allow the operator to make adjustments to the height/orientation of the blade 128, when necessary, as the grading vehicle 104 continues to move across the worksite 102 during the performance of the grading operation. For instance, such information may include, but is not limited to, the marker type associated with the site marker 106 (e.g., right-of-way, offset, slope, shoulder, centerline, finish, etc.), the location of the marker 106 within the worksite 102, the direction to grade (e.g., on grade, cut, fill, slope, etc.), the distance to grade, the slope ratio, the distance from the centerline of the grade, and/or the like. In addition (or as an alternative thereto), the displayed information may include specific information related to adjustments that need to be made by the operator to ensure that the desired surface grade is obtained based on the grading parameters to be applied at or adjacent to the current location of the grading vehicle 104.

For instance, based on the grade parameter data (e.g., the direction/distance to grade and any applicable slope ratio), the controller 110 may indicate (via information presented on the display 134) that the height and/or orientation of the blade 128 should be adjusted by a given distance or angular amount to achieve the desired surface grade.

Alternatively, the grading vehicle 104 may be operated within in automatic mode in which the controller 110 automatically controls the operation of the components of the hydraulic system 138 based on the grading information associated with each encountered site marker 106 as the grading vehicle 104 moves across a worksite 102 during the performance of a grading operation. For instance, in embodiments in which the grading vehicle 104 is equipped with an automatic blade control system including one or more sensing devices configured to determine a height reference for the grading operation (e.g., using the sensor assemblies 150, 152 described above, thereby allowing the associated sensors 154, 156 to detect the rotating laser emitted from the grading device 158 across a given horizontal reference plane), the controller 110 may be configured to automatically determine the height of the blade 128 relative to the height reference (e.g., the horizontal reference plane calculated based on the data received from the sensors 154, 156). In such embodiments, as the grading vehicle 104 encounters a site marker 106 and the controller 110 acquires the relevant data from the marker sensor(s) 108, the associated grading information may be used to automatically apply adjustments to the blade position. For instance, the grading information may be used to determine the desired surface grade relative to the height reference (e.g., the horizontal reference plane detected by the sensors 154, 156). The controller 110 may then actively control the appropriate components of the hydraulic system 138 (e.g., the lift control valves 144 and/or the tilt control valves 146 to control the operation of the lift cylinders 140 and/or tilt cylinders 142, respectively) to adjust the position of the blade 128 relative to the ground in a manner that allows the desired surface grade to be achieved.

It should be appreciated that, in certain embodiments of the present subject matter, the data transmission devices 170 associated with the site markers 106 may be configured to communicate with one another. In such embodiments, the ability to communicate may allow each data transmission device 170 to determine or infer when its associated site marker 106 is not properly located within the worksite 102 and/or when the grading information stored within the data transmission device 170 has not been properly updated. For instance, each data transmission device 170 may be configured to receive the grading information stored on the data transmission devices 170 of adjacent site markers 106 and compare such information to its on grading information. If the comparison indicates that a significantly large grade change is occurring between the location of its respective site marker 106 and the location of an adjacent site marker 106, the data transmission device 170 may flag itself or transmit a notification tot eh vehicle controller 110 indicating that its grading information may not be accurate. As an alternative to intercommunications between the data transmission devices 170, the controller 110, itself, may be configured to detect anomalies in the grading information between adjacent site markers 106. For instance, if the grading information for a given site marker 106 differs from the grading information for an adjacent site marker 106 by a significant amount, as determined by the controller 110 based on the data received from the marker sensor(s) 108, the controller 110 may flag one or more of the site markers 106 located within the immediate area to be reviewed (including alerting the operator of potential issues with the grading information associated with one or more of the site markers 106).

Figure 3:
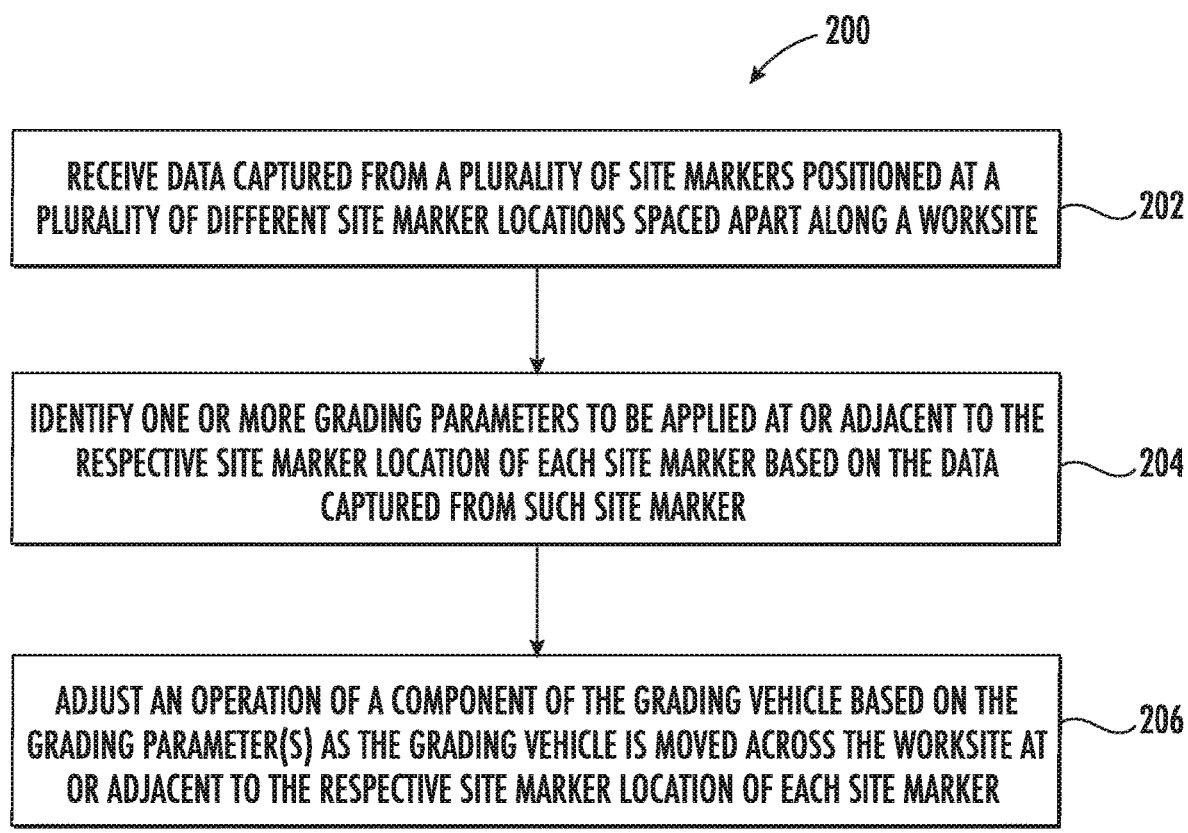
FIG. 3 illustrates a flow diagram of one embodiment of a method for performing a grading operation relative to a worksite in accordance with aspects of the present subject matter.

Referring now to FIG. 3, one embodiment of a method 200 for performing a grading operation relative to a worksite is illustrated in accordance with aspects of the present subject matter. In general, the method 200 will be described with reference to the system 100 described above with reference to FIGS. 1 and 2. However, it should be appreciated by those of ordinary skill in the art that the disclosed method 200 may generally be utilized when performing a grading operation as part of any system have any other suitable system configuration. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 3, at (202), the method 200 includes receiving data captured from a plurality of site markers positioned at a plurality of different site marker locations spaced apart along a worksite. Specifically, as indicated above, the vehicle controller 110 may, in one embodiment be configured to receive the data captured by the marker sensor(s) 108 of the grading vehicle 104 as the vehicle 104 is being used to perform a grading operation at a worksite 102. In such embodiment, the marker sensor(s) 108 may, for example, be configured to capture the data from each site marker 106 by receiving the data transmitted from a data transmission device 170 associated with each site marker 106 and/or by visually detecting a visual indicator 176 associated with each site marker 106.

Additionally, at (204), the method 200 includes identifying one or more grading parameters to be applied at or adjacent to the respective site marker location of each site marker during the performance of the grading operation based on the data captured from such site marker. For instance, as indicated above, in several embodiments, the marker sensor(s) 108 may be configured to directly receive or read data associated with the grading parameters each site marker. In such embodiments, the vehicle controller 110 may receive the data from the marker sensor(s) 108 and identify the grading parameter(s) to be applied at or adjacent to the location of each site marker. Alternatively, the marker sensor(s) 108 may be configured to detect data associated with each site marker 106 that indirectly relates to the grading information for the site marker 106. In such an embodiment, the vehicle controller 108 may be configured to access suitable data stored within its memory (e.g., a look-up table) to identify the grading parameter(s) to be applied at or adjacent to the location of each site marker.

Moreover, at (206), the method 200 includes adjusting an operation of a component of the grading vehicle based on the grading parameter(s) as the grading vehicle is moved across the worksite at or adjacent to the respective site marker location of each site marker within the worksite. Specifically, as indicated above, the controller 110 may, for example, be configured to update the grading-related data presented to the operator via a display device 134 of the grading device 104 as the controller 110 receives updated or new grading information from each encountered site marker 106. In addition (or as an alternative thereto), the controller 110 may be configured to control the operation of one or more components of the vehicle's hydraulic system 138 to adjust the position of the blade 128 as the controller 110 receives updated or new grading information from each encountered site marker 106.

It should be appreciated that, in several embodiments, the steps of the method 200 are performed by the controller 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 110 described herein, such as the methods 200, is implemented in software code or instructions which are tangibly stored on a tangible computer readable medium. The controller 110 loads the software code or instructions via a direct interface with the computer readable medium or via a wired and/or wireless network. Upon loading and executing such software code or instructions by the controller 110, the controller 110 may perform any of the functionality of the controller 110 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for performing a grading operation relative to a worksite, the system comprising:
   a plurality of site markers positioned at a plurality of different site marker locations spaced apart along the worksite, each site marker being associated with grading information related to one or more grading parameters to be applied at or adjacent to its respective site marker location within the worksite during the performance of the grading operation;
   a grading vehicle including a marker sensor configured to capture data providing an indication of the grading information from each site marker; and
   a controller communicatively coupled to the marker sensor, the controller being configured to identify the grading information based on the data received from the marker sensor and control the operation of a component of the grading vehicle during the performance of the grading operation based on the one or more grading parameters associated with the grading information.

2. The system of claim 1, further comprising a data transmission device provided in operative association with each site marker, the data transmission device being configured to store and transmit data indicative of the grading information associated with its respective site marker to the marker sensor.

3. The system of claim 2, wherein the data transmission device includes a wireless communications device configured to wirelessly transmit the data to the marker sensor.

4. The system of claim 2, wherein the data transmission device is configured as or forms part of an RFID tag.

5. The system of claim 2, further comprising a portable electronic device configured to transmit the grading information to the data transmission device for storage thereon.

6. The system of claim 1, wherein each site marker includes a visual indicator indicative of the grading information, the marker sensor comprising a vision-based sensor configured to detect the visual indicator.

7. The system of claim 6, wherein the visual indicator comprises a machine-readable visual code or at least one of a specific color or alphanumeric code.

8. The system of claim 1, wherein the component comprises a grading implement of the grading vehicle, the controller being configured to adjust a position of the grading implement based on the one or more grading parameters associated with grading information.

9. The system of claim 8, wherein the controller is configured to adjust the position of the grading implement by controlling an operation of one or more actuators coupled to the grading implement.

10. The system of claim 1, wherein the component comprises an output device of a user interface of the grading vehicle.

11. The system of claim 10, wherein the output device comprises a display device of the grading vehicle.

12. The system of claim 1, wherein the grading information is assigned to each site marker based on a grading map that defines a desired surface grade at each site marker location along the worksite.

13. A method for performing a grading operation relative to a worksite, the method comprising:

receiving, with a computing device, data captured from a plurality of site markers positioned at a plurality of different site marker locations spaced apart along the worksite;

based on the data associated with each site marker, identifying, with the computing device, one or more grading parameters to be applied at or adjacent to the respective site marker location of the site marker during the performance of the grading operation; and adjusting, with the computing device, an operation of a component of the grading vehicle based on the one or more grading parameters as the grading vehicle is moved across the worksite at or adjacent to the respective site marker location of each site marker within the worksite.

14. The method of claim 13, wherein receiving the data captured from the plurality of site markers comprises receiving the data from a marker sensor supported on the grading vehicle, the marker sensor configured to capture the data from the plurality of site markers.

15. The method of claim 14, wherein the marker sensor is configured to wirelessly capture the data from a data transmission device associated each site marker.

16. The method of claim 14, wherein the marker sensor is configured to visually detect a visual indicator associated with each site marker.

17. The method of claim 13, wherein adjusting the operation of the component of the grading vehicle comprises controlling an operation of an actuator coupled to a grading implement of the grading vehicle to adjust a position of the grading implement based at least in part on the one or more grading parameters associated with each site marker.

18. The method of claim 17, further comprising determining an adjustment to be made to the position of the grading implement based on a reference height position.

19. The method of claim 13, wherein adjusting the operation of the component of the grading vehicle comprises varying information presented on a display device of the grading vehicle based on the one or more grading parameters associated with each site marker.

20. The method of claim 13, further comprising assigning the one or more grading parameters to each site marker based on a grading map that defines a desired surface grade at each site marker location along the worksite.

* * * * *